United States Patent
Tiirola et al.

(10) Patent No.: US 9,826,382 B2
(45) Date of Patent: Nov. 21, 2017

(54) PROXIMITY SERVICE IN COMMUNICATIONS

(75) Inventors: Esa Tapani Tiirola, Kempele (FI); Kari Juhani Hooli, Oulu (FI); Timo Erkki Lunttila, Espoo (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 19 days.

(21) Appl. No.: 14/426,833

(22) PCT Filed: Sep. 11, 2012

(86) PCT No.: PCT/EP2012/067683
§ 371 (c)(1),
(2), (4) Date: Jun. 18, 2015

(87) PCT Pub. No.: WO2014/040610
PCT Pub. Date: Mar. 20, 2014

(65) Prior Publication Data
US 2015/0327047 A1   Nov. 12, 2015

(51) Int. Cl.
*H04W 8/22* (2009.01)
*H04W 76/02* (2009.01)
*H04W 4/00* (2009.01)
*H04W 72/00* (2009.01)
*H04W 8/00* (2009.01)

(52) U.S. Cl.
CPC .......... *H04W 8/005* (2013.01); *H04W 4/005* (2013.01); *H04W 76/023* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 2009/0010185 A1 | 1/2009 | Li et al. | 370/280 |
| 2010/0261469 A1 | 10/2010 | Ribeiro et al. | 455/423 |
| 2010/0272076 A1* | 10/2010 | Cavalcanti | H04W 74/004 370/336 |
| 2010/0309798 A1* | 12/2010 | Fodor | H04W 52/06 370/252 |

(Continued)

*Primary Examiner* — Ayaz Sheikh
*Assistant Examiner* — Tarell Hampton
(74) *Attorney, Agent, or Firm* — Harrington & Smith

(57) ABSTRACT

Two physical layer user terminal capability alternatives are introduced for device-to-device discovery for FDD mode terminals: a full discovery physical layer capability, and a partial discovery physical layer capability. The full discovery physical layer capability corresponds to an alternative where a discovery-capable user terminal has a capability to perform both Discovery_Scan (on an uplink band) and Discovery_Tx (on a downlink band) operations. A Discovery_Tx operation corresponds to transmission of a discovery signal to another user terminal directly over the air. A Discovery_Scan operation corresponds to reception of the discovery signal from another user terminal directly over the air. The partial discovery physical layer capability corresponds to an alternative where the discovery-capable terminal has a capability to perform either Discovery_Scan operation (on the downlink band) or Discovery_Tx (on the uplink band) operation (or both).

15 Claims, 9 Drawing Sheets

(56) References Cited

U.S. PATENT DOCUMENTS

| | | | |
|---|---|---|---|
| 2011/0243010 A1* | 10/2011 | Geirhofer | H04W 52/08 370/252 |
| 2011/0282989 A1 | 11/2011 | Geirhofer et al. | 709/224 |
| 2012/0051240 A1 | 3/2012 | Dwivedi et al. | 370/252 |
| 2012/0134349 A1* | 5/2012 | Jung | H04W 8/005 370/338 |
| 2013/0288668 A1* | 10/2013 | Pragada | H04W 12/06 455/426.1 |
| 2013/0301438 A1* | 11/2013 | Li | H04W 76/048 370/252 |
| 2014/0003262 A1* | 1/2014 | He | H04W 28/08 370/252 |
| 2014/0056220 A1* | 2/2014 | Poitau | H04W 40/246 370/328 |

* cited by examiner

PROXIMITY SERVICE IN COMMUNICATIONS

FIELD OF THE INVENTION

The exemplary and non-limiting embodiments of this invention relate generally to wireless communications networks, and more particularly to a proximity service.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Studies for proximity services (ProSe) in 3GPP disclose data paths for communication, if user terminals are in proximity of each other, i.e. they are able to use a direct path, or a locally routed path via a base station, in order to communicate with each other.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, a computer program product, and a computer-readable storage medium as defined in the independent claims. Further embodiments of the invention are disclosed in the dependent claims.

An aspect of the invention relates to a method for device-to-device discovery in a communications system, comprising transmitting, from a first user terminal a device-to-device discovery signal via a downlink band or resources in order for the first user terminal to be detected by a second user terminal when the device-to-device discovery signal is received via the downlink band or resources in the second user terminal, wherein the first user terminal is configured to support device-to-device discovery signal transmission via a downlink band or resources, and optionally device-to-device discovery signal reception via an uplink band or resources, wherein the second user terminal is configured to support device-to-device discovery signal reception via the downlink band or resources, and the second user terminal is incapable of supporting device-to-device discovery signal transmission.

A further aspect invention relates to a method for device-to-device discovery in a communications system, comprising transmitting, from a first user terminal, a device-to-device discovery signal via an uplink band or resources in order for the first user terminal to be detected by a second user terminal when the device-to-device discovery signal is received via the uplink band or resources in the second user terminal, wherein the first user terminal is configured to support device-to-device discovery signal transmission via an uplink band or resources, and the first user terminal is incapable of supporting device-to-device discovery signal reception, wherein the second user terminal is configured to support device-to-device discovery signal reception via the uplink band or resources, and optionally device-to-device discovery signal transmission via a downlink band or resources.

A still further aspect of the invention relates to a method for device-to-device discovery in a communications system, comprising receiving, from a first user terminal in a second user terminal, a device-to-device discovery signal via a downlink band or resources in order for the first user terminal to be detected by the second user terminal, wherein the first user terminal is configured to support device-to-device discovery signal transmission via a downlink band or resources, and optionally device-to-device discovery signal reception via an uplink band or resources, wherein the second user terminal is configured to support device-to-device discovery signal reception via a downlink band or resources, and the second user terminal is incapable of supporting device-to-device discovery signal transmission.

A still further aspect of the invention relates to a method for device-to-device discovery in a communications system, comprising receiving, from a first user terminal in a second user terminal, a device-to-device discovery signal via an uplink band or resources in order for the first user terminal to be detected by the second user terminal, wherein the first user terminal is configured to support device-to-device discovery signal transmission via an uplink band or resources, and the first user terminal is incapable of supporting device-to-device discovery signal reception, wherein the second user terminal is configured to support device-to-device discovery signal reception via the uplink band or resources, and optionally device-to-device discovery signal transmission via a downlink band or resources.

A still further aspect of the invention relates to a terminal apparatus comprising at least one processor, and at least one memory including a computer program code, wherein the at least one memory and the computer program code are configured to, with the at least one processor, cause the terminal apparatus to transmit a device-to-device discovery signal via a downlink band or resources in order for the terminal apparatus to be detected by a further terminal apparatus when the device-to-device discovery signal is received via the downlink band or resources in the further terminal apparatus, wherein the terminal apparatus is configured to support device-to-device discovery signal transmission via a downlink band or resources, and optionally device-to-device discovery signal reception via an uplink band or resources, wherein the further terminal apparatus is configured to support device-to-device discovery signal reception via the downlink band or resources, and the further terminal apparatus incapable of supporting device-to-device discovery signal transmission.

A still further aspect of the invention relates to a terminal apparatus comprising at least one processor, and at least one memory including a computer program code, wherein the at least one memory and the computer program code are configured to, with the at least one processor, cause the terminal apparatus to transmit a device-to-device discovery signal via a uplink band or resources in order for the terminal apparatus to be detected by a further terminal apparatus when the device-to-device discovery signal is received via the uplink band or resources in the further terminal apparatus, wherein the terminal apparatus is configured to support device-to-device discovery signal transmission via an uplink band or resources, and the terminal apparatus is incapable of supporting device-to-device discovery signal reception, wherein the further terminal apparatus is configured to support device-to-device discovery signal reception via the uplink band or resources, and optionally device-to-device discovery signal transmission via a downlink band or resources.

A still further aspect of the invention relates to a terminal apparatus comprising at least one processor, and at least one memory including a computer program code, wherein the at least one memory and the computer program code are configured to, with the at least one processor, cause the terminal apparatus to receive, from a further terminal apparatus, a device-to-device discovery signal via a downlink band or resources in order for the further terminal apparatus to be detected by the terminal apparatus, wherein the further terminal apparatus is configured to support device-to-device discovery signal transmission via a downlink band or resources, and optionally device-to-device discovery signal reception via an uplink band or resources, wherein the terminal apparatus is configured to support device-to-device discovery signal reception via the downlink band or resources, and the terminal apparatus is incapable of supporting device-to-device discovery signal transmission.

A still further aspect of the invention relates to a terminal apparatus comprising at least one processor, and at least one memory including a computer program code, wherein the at least one memory and the computer program code are configured to, with the at least one processor, cause the terminal apparatus to receive, from a further terminal apparatus, a device-to-device discovery signal via an uplink band or resources in order for the further terminal apparatus to be detected by the terminal apparatus when the device-to-device discovery signal is received via the uplink band or resources in the terminal apparatus, wherein the further terminal apparatus is configured to support device-to-device discovery signal transmission via an uplink band or resources, and the further terminal apparatus is incapable of supporting device-to-device discovery signal reception, wherein the terminal apparatus is configured to support device-to-device discovery signal reception via the uplink band or resources, and optionally device-to-device discovery signal transmission via a downlink band or resources.

A still further aspect of the invention relates to a network apparatus comprising at least one processor, and at least one memory including a computer program code, wherein the at least one memory and the computer program code are configured to, with the at least one processor, cause the network apparatus to transmit a first device-to-device discovery configuration signal via layer-2 or higher layer signalling to a first terminal apparatus in order for the first terminal apparatus to be configured to support device-to-device discovery signal transmission via a downlink band or resources, and optionally device-to-device discovery signal reception via an uplink band or resources, transmit a second device-to-device discovery configuration signal via layer-2 or higher layer signalling to a second terminal apparatus in order for the second terminal apparatus to be configured to support device-to-device discovery signal reception via the downlink band or resources, and incapable of supporting device-to-device discovery signal transmission.

A still further aspect of the invention relates to a network apparatus comprising at least one processor, and at least one memory including a computer program code, wherein the at least one memory and the computer program code are configured to, with the at least one processor, cause the network apparatus to transmit a first device-to-device discovery configuration signal via layer-2 or higher layer signalling to a first terminal apparatus in order for the first terminal apparatus to be configured to support device-to-device discovery signal transmission via an uplink band or resources, and incapable of supporting device-to-device discovery signal reception, transmit a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

A still further aspect of the invention relates to a method for device-to-device discovery in a communications system, comprising transmitting, from network apparatus, a first device-to-device discovery configuration signal via layer-2 or higher layer signalling to a first terminal apparatus in order for the first terminal apparatus to be configured to support device-to-device discovery signal transmission via a downlink band or resources, and optionally device-to-device discovery signal reception via an uplink band or resources; and transmitting, from network apparatus, a second device-to-device discovery configuration signal via layer-2 or higher layer signalling to a second terminal apparatus in order for the second terminal apparatus to be configured to support device-to-device discovery signal reception via the downlink band or resources, and incapable of supporting device-to-device discovery signal transmission.

A still further aspect of the invention relates to a method for device-to-device discovery in a communications system, comprising transmitting, from network apparatus, a first device-to-device discovery configuration signal via layer-2 or higher layer signalling to a first terminal apparatus in order for the first terminal apparatus to be configured to support device-to-device discovery signal transmission via an uplink band or resources, and incapable of supporting device-to-device discovery signal reception, and transmitting, from network apparatus, a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

LTE Rel-12/13 is assumed to be commercially available around 2016-2017. An exemplary embodiment relates to device-to-device discovery physical layer aspects. An objective of a related 3GPP feasibility study is to evaluate following aspects of device-to-device over-the-air discovery:

define and evaluate assumptions and performance metrics for device-to-device discovery [RAN1], identify physical layer options and enhancements to incorporate in LTE an ability for devices to discover each other directly over the air in an always-on low power manner [RAN1], identify option and enhancements to an LTE protocol and LTE RAN to allow applications running in proximal devices to discover each other over the air and to allow the network to supervise the discovery process [RAN2], identify enhancements to LTE in case of a dedicated spectrum shared by multiple operators [RAN2], consider terminal-specific aspects, e.g. battery impact and requirements deriving from direct device-to-device discovery [RAN4].

An exemplary embodiment relates to the second bullet above, i.e. to identifying physical layer options and enhancements to incorporate in LTE the ability for D2D to discover each other over the air in low-power manner.

An exemplary embodiment relates to minimizing additional costs and complexity involved when introducing a new network feature such as D2D discovery in the LTE networks, i.e. how to keep UE costs at a reasonable level while having a reasonable coverage for the new D2D discovery service implemented in the network.

A typical assumption in the context of D2D discovery and communications is that all D2D-capable UEs are able to both send an indication about their presence (e.g. transmit discovery signal), and receive D2D information directly from the other D2D UE (e.g. receive discovery signal).

Figure 1:
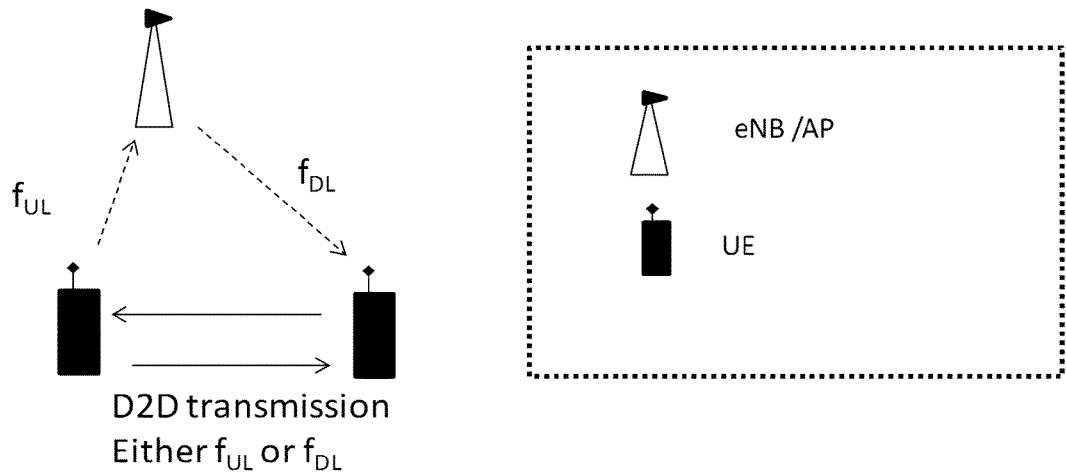
FIG. 1 illustrates basic duplexing options for D2D operation.

A typical assumption regarding D2D communications is that either FDD DL or UL spectrum is used in a TDD manner for a D2D link. The principle of basic duplexing options for D2D operation is illustrated in FIG. 1. While in FDD, in the communication between eNode-B and UE, a different frequency is used depending on the link direction ($f_{UL}$ for uplink and $f_{DL}$ for downlink), it is usually assumed for simplicity that a D2D operation utilizes TDD and hence only one of the frequencies (either $f_{UL}$ or $f_{DL}$). This imposes certain challenges to the D2D UE implementation: if $f_{DL}$ is to be used for the D2D link, D2D UE would need to comprise a transmitter operating at $f_{DL}$ and preferably capable of transmitting signals with a DL wave form; if $f_{UL}$ is to be used for D2D link, D2D UE would need to comprise a receiver operating at $f_{UL}$ and preferably capable of receiving signals with a UL wave form. These challenges mean significant added complexity for D2D UE compared to ordinary (non-D2D-capable) UEs. An exemplary embodiment introduces a simplified operation mode for D2D UEs, which allows supporting a basic D2D discovery functionality with modest implementation and standardization effort.

Introducing the discovery functionality in the LTE networks by means of the method illustrated in FIG. 1 involves significant added complexity at the UE side. Hence, the UE complexity aspect may prevent introducing D2D discovery functionality in a cost efficient manner in FDD networks. On the other hand, it should be noted a network feature such as the D2D discovery requires sufficient UE penetration to reach the true benefits of the feature. This is the case especially from the operator and/or a discovery service provider point of view. Hence, cost efficiency may be a key element when introducing the D2D discovery in the specifications.

An exemplary embodiment relates to a physical layer arrangement for D2D discovery. An exemplary embodiment relates to an arrangement for supporting full-blown D2D discovery in the network having two different D2D physical layer capabilities in use, namely a full discovery PHY and a partial discovery PHY. In an exemplary embodiment UEs indicate their D2D discovery capability (full vs. partial) to the network (e.g. to eNB) by using e.g. higher layer signalling (i.e. higher than L1/physical layer; e.g. L2/data link layer, L3/network layer, L4/transport layer, L5/session layer, L6/presentation layer, L7/application layer).

In an exemplary embodiment two physical layer alternatives (i.e. UE capabilities/categories/classes) are introduced for the device-to-device discovery for FDD mode terminals: the full discovery PHY, and the partial discovery PHY.

The full discovery PHY for the device-to-device discovery for FDD mode terminals corresponds to an alternative where a discovery-capable UE has a capability to perform both Discovery_Scan and Discovery_Tx operations. A Discovery_Tx operation corresponds to transmission of a discovery signal. A Discovery_Scan operation corresponds to reception of a discovery signal from another UE directly over the air as well as to scanning and/or searching for discovery signal presence. The full discovery PHY may require that UE supports, in addition to legacy functionality, transmission on DL band, reception on UL band, and, optionally, both transmission on DL and reception on UL band. Legacy functionality refers to reception in the DL band and transmission in the UL band; each UE is expected to have this capability. In an exemplary embodiment, support for the full discovery PHY is a feature supported by predefined UE categories only (in other words, it is an UE category feature).

The partial discovery PHY for the device-to-device discovery for FDD mode terminals corresponds to an alternative where the discovery capable UE has a capability to perform either Discovery_Scan operation (on the DL band) or Discovery_Tx (on the UL band) operation (or both). Usage of the partial discovery PHY may be limited to cases having at least one UE with the full discovery PHY in a geographical area of interest (e.g. cell). UEs with the full discovery PHY may be purchased and used by users with a particular motivation to be locally discovered by other users. One such motivation may be the willingness to provide local advertising type of services. In an exemplary embodiment, support of the partial discovery PHY is not a UE category feature (thus from a PHY point of view, each UE may support the partial discovery PHY).

Figure 2:
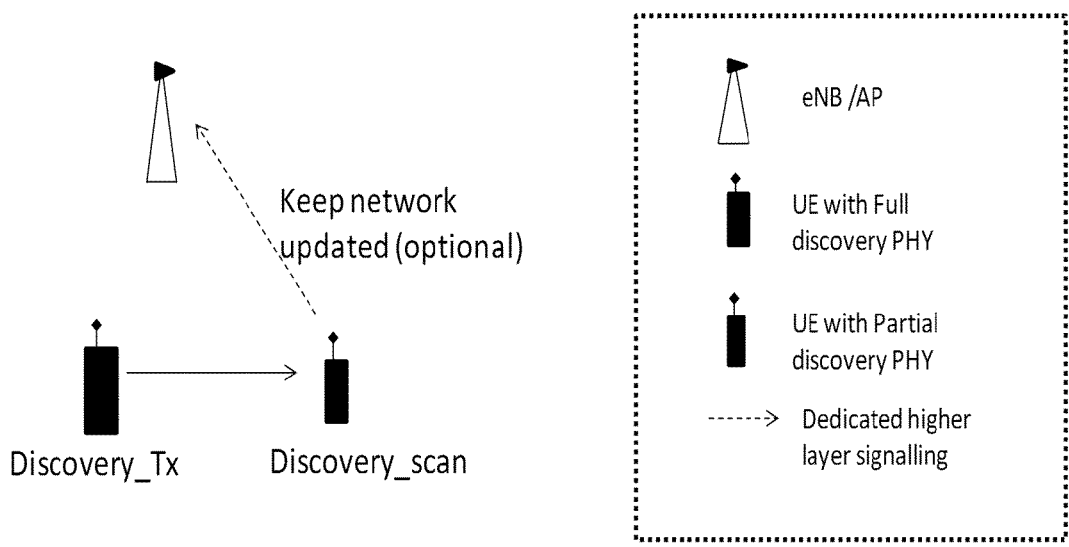
FIG. 2 illustrates a discovery procedure with scanning UE having partial physical layer capabilities for discovery according to an embodiment of the invention.

Regarding the partial discovery PHY with support of Discovery_Scan, Discovery_Scan UEs are capable of receiving D2D discovery signals but not able to send them on the DL band. In order to minimize the PHY impact of D2D discovery, Discovery_Tx and Discovery_Scan are based on the usage of an existing DL band (thus RF impact is minimized). Furthermore, an OFDMA signal format, and preferably one of the existing DL channels or signals (e.g. PDCCH, ePDCCH or PSS/SSS) are used as discovery signals. Discovery_Tx may be e.g. periodic transmission (configured by eNB). Discovery_Scan may be e.g. a blind decoding type of operation similar to the blind decoding e.g. in PDCCH reception, or energy detection for a pre-defined signal type. A related discovery procedure/D2D discovery configuration with scanning UE having the partial discovery PHY is illustrated in FIG. 2. As can be seen from FIG. 2, UEs supporting the "partial discovery PHY with Discovery_scan" are able to support a discovery feature with a very small or even without any additional PHY impact compared to legacy operation.

Figure 3:
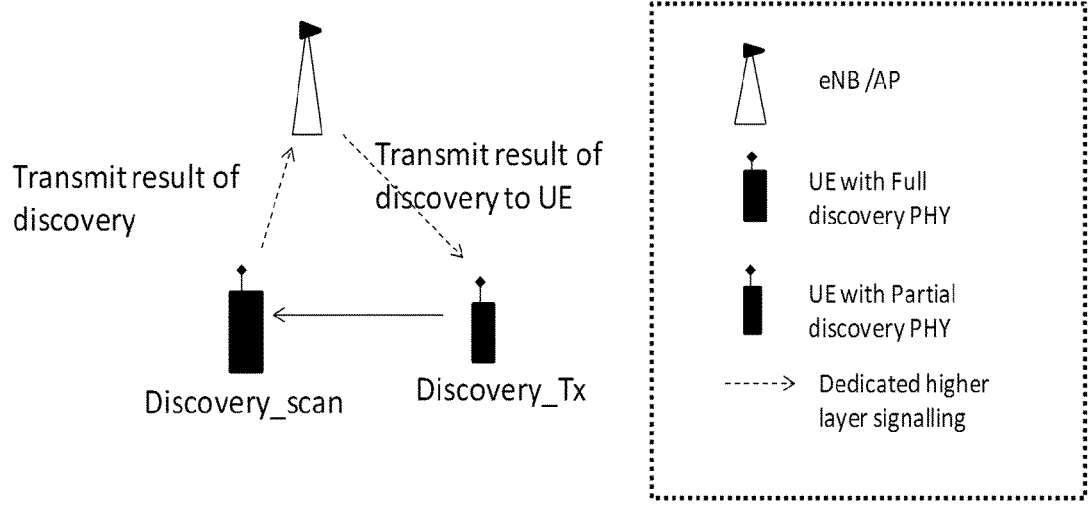
FIG. 3 illustrates a discovery procedure with transmitting UE having partial physical layer capabilities for discovery according to an embodiment of the invention.

Regarding the partial discovery PHY with support of Discovery_Tx, Discovery_Tx UEs are capable of transmitting the D2D discovery signals but not able to receive them on the UL band. In order to minimize the PHY impact due to discovery, Discovery_tx may be based on the usage of existing UL band (thus RF impact is minimized), SC-FDMA signal format, and optionally one of the existing UL channels (e.g. PUCCH format 1/2/3, periodical PUSCH, PRACH, or a sounding reference signal). Discovery_Tx may be e.g. periodic transmission of predefined signal (configured by eNB). Discovery_Scan may be e.g. a blind decoding type of operation based on verification of CRC bits. Alternatively (if CRC bits do not exist) scan may involve a DTX detection of the transmitted signal (or basically any energy detection). Discovery procedure/D2D discovery configuration with transmitting UE having the partial discovery PHY is illustrated in FIG. 3. As can be seen from FIG. 3, sufficient layer signalling is needed to support the discovery (scan) feature for UEs supporting the "partial discovery PHY with support of Discovery_Tx". UE with the full discovery PHY reports the result of Discovery_Scan to a network element (eNB/AP). eNB/AP may report the result of Discovery_Scan to UE transmitting Discovery_Tx. The signalling may be higher layer signalling (e.g. RRC (L3) or MAC (L2 sub-layer)). In an exemplary embodiment, the signalling may be realized by PHY signalling or by a combination of PHY and higher layer signalling.

An exemplary embodiment relates to FDD mode UEs. However, TDD-LTE may be covered by replacing a UL/DL band by UL/DL resources disclosed above. In a TDD mode, UL and DL share the same band, thus RF complexity is not the argument behind the partial discovery PHY. Other reasons to apply the TDD mode may include e.g. backwards compatibility, and a minimized baseband processing impact.

Figure 4:
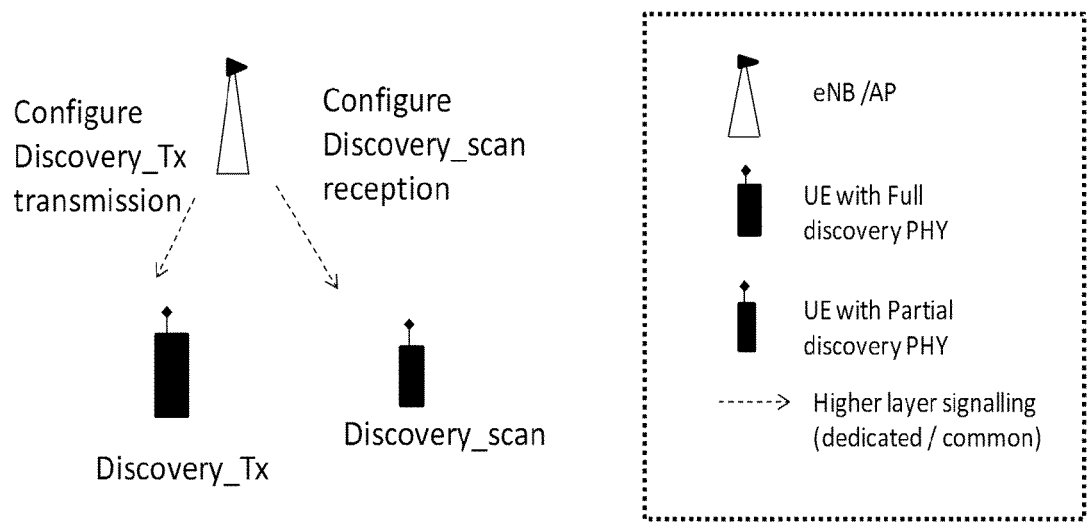
FIG. 4 illustrates exemplary configuration signalling related to D2D discovery according to an embodiment of the invention.

FIG. 4 illustrates exemplary configuration signalling related to D2D discovery. An exemplary embodiment considers the case of the "partial discovery PHY with support of Discovery_Scan". Similar steps are applicable also in the case with partial discovery PHY with support of Discovery Tx on the UL band. The considered D2D discovery may operate in network-controlled fashion with following steps: 1) eNB/AP configures the resources on the DL band available for discovery (frequency (PRB), time (subframe), code, etc.); 2) eNB configures at least one UE to transmit a Discovery_Tx signal having a predefined channel type (e.g. ePDCCH, PSS/SSS, etc.), pre-defined content (UE_ID, etc.), predefined parameters (Tx power, MCS, etc.), the signalling of the configuration may be e.g. dedicated higher layer signalling (e.g. RRC); 3) eNB configures at least one UE to perform discovery scan on the resources configured for D2D discovery.

An exemplary embodiment enables providing wide support for D2D discovery functionality having only a limited number of UEs supporting the full discovery PHY. An exemplary embodiment enables a minimized additional UE complexity and cost for the UEs with the partial discovery PHY. In an exemplary embodiment there is no need for a new transmitter or receiver supporting a different band in UEs with the partial discovery PHY. In an exemplary embodiment only minor L1 changes are required to apply D2D discovery.

Thus an exemplary embodiment relates to device-to-device (D2D) communications between LTE frequency division duplex (FDD) mode terminals, and more specifically to a discovery procedure which identifies that a user equipment (UE) is in a proximity of another.

In device-to-device communications between FDD mode terminals, existing solutions assume that the D2D operation utilizes only one of the frequencies (either f_uplink (UL) or f_downlink (DL)). Hence, UE which is able to communicate (two ways) with another UE directly, needs to have a transmitter operating at a downlink frequency, and a receiver operating at an uplink frequency. Both options mean significant added complexity for D2D UE compared to ordinary (non-D2D capable) UEs.

An exemplary embodiment provides a discovery solution for non-discovery (or non-D2D) capable FDD UEs without having to implement additional RF chains and thus keeping physical layer changes very minor. An exemplary embodiment enables including a partial discovery functionality into UEs that otherwise do not support D2D discovery at all, increasing the footprint of D2D services.

An exemplary embodiment presents two types of UEs— "full discovery PHY devices" and "partial discovery PHY devices". The "full discovery PHY devices" are able to receive (on UL band) or transmit (on DL band) a discovery signal from/to another UE directly, or do both (this is a possible but less probable scenario). New functionality may be introduced in UEs from 3GPP release 12 onwards.

The "partial discovery PHY devices" are able to either a) receive the discovery signal on the DL band, or b) transmit the discovery signal on the UL band. The "partial discovery PHY devices" may have a physical layer similar to that of normal legacy (i.e. 3GPP Rel-8/9/10/11) terminal devices. The partial discovery PHY devices are considerably easier and more affordable to implement than the full discovery ones. A typical assumption in D2D communications on cellular bands (FDD) is that D2D communication takes place only on one of two frequency bands (either UL or DL, as illustrated also in FIG. 1). Hence FIG. 2 and FIG. 3 may be considered as alternatives to each other. Otherwise D2D UEs would basically require both Tx and Rx functionalities for both UL and DL bands, which may lead to costly and technically complex devices.

A common view taking into account various aspects (such as interference between cellular operation and D2D) is such that D2D takes place on UL band. Hence, scenario illustrated in FIG. 3 may be more probable than that of FIG. 2.

An exemplary embodiment is based on the involvement of at least one D2D-capable (or full discovery capable) UE to aid a non-discovery capable UE. The main inventive step relates to the question how to involve a full discovery PHY capable UE in providing discovery service for a partial discovery PHY capable UE.

For example, if the uplink frequency is selected, an exemplary embodiment may involve the following functionality according to FIG. 3:

1) "Discovery_Scan UE": reporting (signalling) the result of Discovery_Scan to eNB, 2) eNB: forwarding the reported Discovery_Scan result received from "Discovery_Scan UE" to "Discovery_Tx UE", 3) "Discovery_Tx UE": extracting the report received from eNB.

Based on the approach of FIG. 3, UEs with the full discovery PHY are able to detect each UE configured to send Discovery_Tx in their proximity when the "partial discovery PHY devices" transmit the discovery signal e.g. at predetermined time instants.

In an exemplary embodiment, there is UE with the full discovery PHY available at a fixed place e.g. café, and discovery service is related to the proximity of the café. This means that there is a full discovery UE present at the café which provides e.g. local advertising type of services.

In an exemplary embodiment, regarding the discovery signal, any predefined signals may be used for the discovery purposes. However, from the specification and implementation point of view it may easiest to utilize an existing signal instead of defining a completely new one.

In an exemplary embodiment, synchronization between the devices may be based virtually on any predefined signal. E.g. physical uplink control channel PUCCH uses similar zero-autocorrelation zone sequences as a sounding reference signal (SRS) or a primary synchronisation signal/secondary synchronisation signal (PSS/SSS), and hence a predefined transmission of such a sequence embedded e.g. on PUSCH may work rather well. The D2D procedure may rely on network assistance when it comes to e.g. exchanging information about the synchronisation sequences etc. (see e.g. FIGS. 2-4).

In an exemplary embodiment, device identification may be carried out in multiple ways by using some predetermined signals together with the network assistance. Furthermore, the device capabilities may be obtained e.g. with the help of the network which should anyway be aware of them.

An exemplary embodiment relates to LTE device-to-device proximity discovery for identifying physical layer options and enhancements to incorporate in LTE the ability for devices to efficiently discover each other directly, with network assistance, and (for public safety devices on public safety spectrum) without network assistance, in an always-on low power manner.

An exemplary embodiment discloses an arrangement for supporting full-blown D2D discovery in the network having two different D2D PHY capabilities in use, namely the full discovery PHY and the partial discovery PHY. An exemplary embodiment discloses two options for the partial discovery PHY: one based on Discovery_Scan and OFDMA on the DL band, and the other based on Discovery_Tx and SC-FDMA on the UL band.

A discovery signal may be transmitted in order for a first user terminal to be detected by a second user terminal, and also for the first user terminal to be able to detect available second user terminals in its proximity. The first user terminal may thus inform the second user terminals in its proximity about its existence, and receive a response from the second user terminals.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support device-to-device communication. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (long term evolution) network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 5:
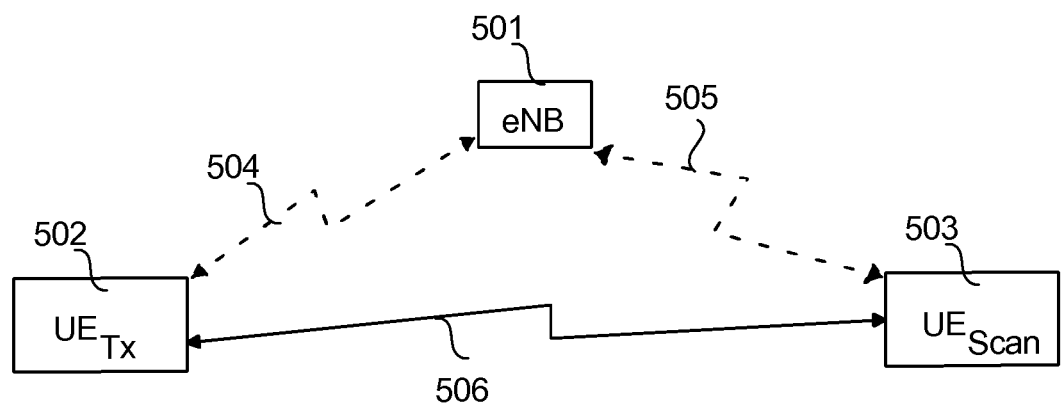
FIG. 5 shows a simplified block diagram illustrating exemplary system architecture.

A general architecture of a communication system is illustrated in FIG. 5. FIG. 5 is a simplified system architecture only showing some elements and functional entities, all being logical units whose implementation may differ from what is shown. The connections shown in FIG. 5 are logical connections; the actual physical connections may be different. It is apparent to a person skilled in the art that the systems also comprise other functions and structures. It should be appreciated that the functions, structures, elements and the protocols used in or for D2D discovery, are irrelevant to the actual invention. Therefore, they need not to be discussed in more detail here.

The exemplary radio system of FIG. 5 comprises a network node 501 of a network operator. The network node 501 may include e.g. an LTE base station (eNB), radio network controller (RNC), or any other network element, or a combination of network elements. The network node 501 may be connected to one or more core network (CN) elements (not shown in FIG. 5) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 5, the radio network node 501 that may also be called eNB (enhanced node-B, evolved node-B) or network apparatus of the radio system, hosts the functions for radio resource management in a public land mobile network. FIG. 5 shows one or more user equipment 502, 503 located in the service area of the radio network node 501. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 5, the user equipment 502 is capable of connecting to the radio network node 501 via a connection 504. In the example situation of FIG. 5, the user equipment 503 is capable of connecting to the radio network node 501 via a connection 505. In the example situation of FIG. 5, the user equipment 502, 503 are capable of connecting to each other via a connection 506.

Figure 6:
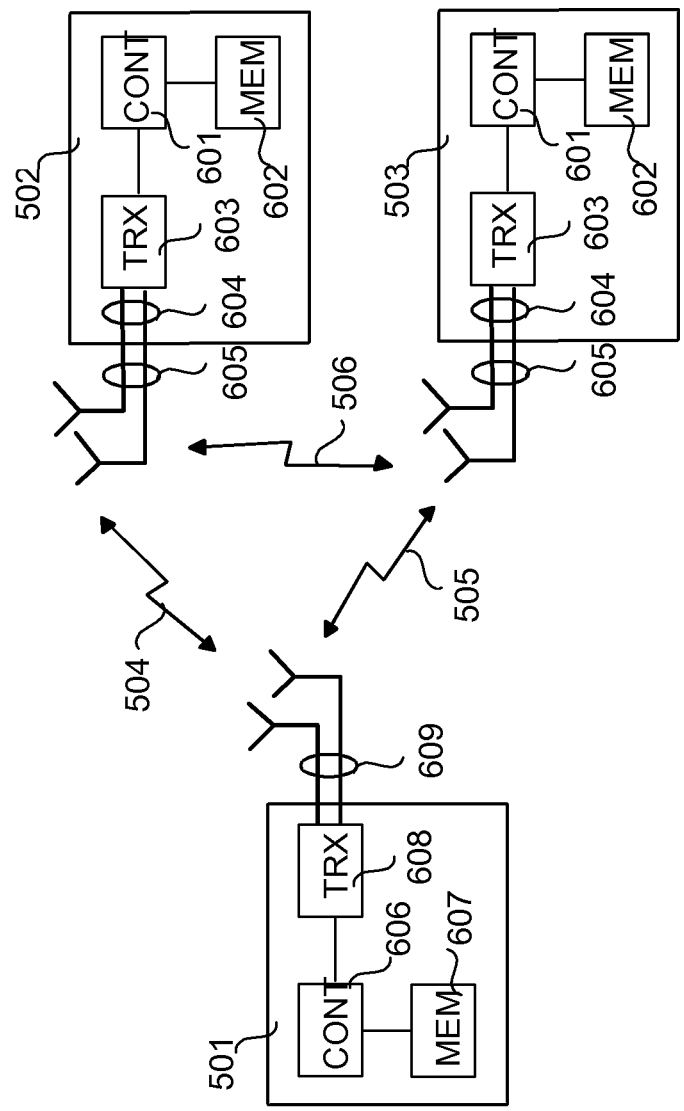
FIG. 6 shows a simplified block diagram illustrating exemplary apparatuses.

FIG. 6 is a block diagram of an apparatus according to an embodiment of the invention. FIG. 6 shows a user equipment 502, 503 located in the area of a radio network node 501. The user equipment 502, 503 is configured to be in connection with the radio network node 501. The user equipment or UE 502, 503 comprises a controller 601 operationally connected to a memory 602 and a transceiver 603. The controller 601 controls the operation of the user equipment 502, 503. The memory 602 is configured to store software and data. The transceiver 603 is configured to set up and maintain a wireless connection 504, 505 to the radio network node 501. The transceiver is operationally connected to a set of antenna ports 604 connected to an antenna arrangement 605. The antenna arrangement 605 may comprise a set of antennas. The number of antennas may be one to four, for example. The number of antennas is not limited to any particular number. The user equipment 502, 503 may also comprise various other components, such as a user interface, camera, and media player. They are not displayed in the figure due to simplicity. The radio network node 501, such as an LTE base station (eNode-B, eNB) or LTE-LAN access point (AP), comprises a controller 606 operationally connected to a memory 607, and a transceiver 608. The controller 606 controls the operation of the radio network node 501. The memory 607 is configured to store software and data. The transceiver 608 is configured to set up and maintain a wireless connection to the user equipment 502, 503 within the service area of the radio network node 501. The transceiver 608 is operationally connected to an antenna arrangement 609. The antenna arrangement 609 may comprise a set of antennas. The number of antennas may be two to four, for example. The number of antennas is not limited to any particular number. The radio network node 501 may be operationally connected (directly or indirectly) to another network element (not shown in FIG. 6) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 501, 502, 503 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 501, 502, 503 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 602, 607 may include volatile and/or non-volatile memory and typically stores content, data, or the like. For example, the memory 602, 607 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 7:
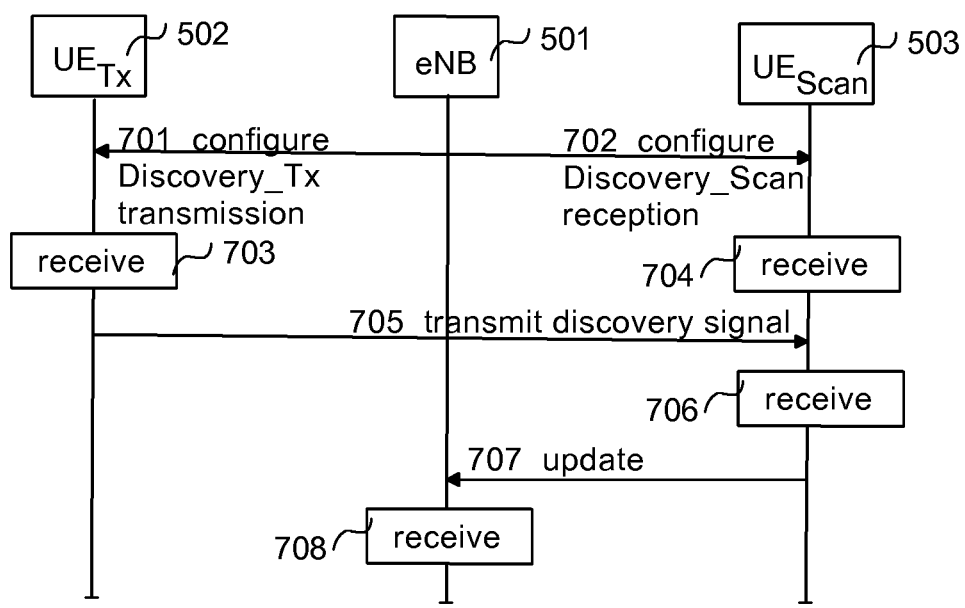
FIG. 7 shows a signalling diagram illustrating an exemplary messaging event according to an embodiment of the invention.

The signalling chart of FIG. 7 illustrates the required signalling in the example situations of FIGS. 2 and 4. In the example of FIG. 7, a network node 501 (which may comprise e.g. a LTE-capable base station (eNode-B, eNB)) may transmit a configuration signal 701 to a first user terminal 502 (UE$_{Tx}$) supporting full discovery PHY operation, for configuring UE$_{Tx}$ 502 to transmit a Discovery_Tx signal having, for example, a pre-defined channel type (e.g. ePD-CCH, PSS/SSS, etc.), pre-defined content (UE_ID, etc.), and/or pre-defined parameters (Tx power, MCS, etc.). This signalling 701 may be e.g. dedicated higher layer (i.e. higher than L1/PHY) signalling (e.g. RRC). Before transmitting the signalling 701, eNB 501 may configure (not shown in FIG. 7) the resources available for discovery (frequency (PRB), time (sub-frame), code, etc.). The network apparatus 501 may transmit a configuration signal 702 to a second user terminal 503 ($UE_{Scan}$) supporting partial discovery PHY operation, for configuring $UE_{Scan}$ 503 to perform a discovery scan on the resources configured for D2D discovery (i.e. to perform Discovery_Scan reception). In item 703, $UE_{Tx}$ 502 receives the configuration signal 701. In item 704, $UE_{Scan}$ 503 receives the configuration signal 702. In item 705, $UE_{Tx}$ 502 transmits a Discovery_Tx signal (on DL band/PHY) to $UE_{Scan}$ 503 in order the first user terminal 502 to be detected by the second user terminal 503. Transmission of the Discovery_Tx signal may be e.g. periodic transmission. In item 706, $UE_{Scan}$ 503 performs a Discovery_Scan operation (on DL band/PHY). The Discovery_Scan operation may be e.g. PDCCH blind decoding type of operation or energy detection for the pre-defined signal type. In item 707, $UE_{Scan}$ 503 may optionally keep the network updated on the D2D discovery process between $UE_{Tx}$ 502 and $UE_{Scan}$ 503, by transmitting corresponding dedicated higher layer signalling to eNB 501. In item 708, eNB 501 may receive the signalling 707. In item 708, eNB 501 may also store information on the D2D discovery process between $UE_{Tx}$ 502 and $UE_{Scan}$ 503.

Figure 8:
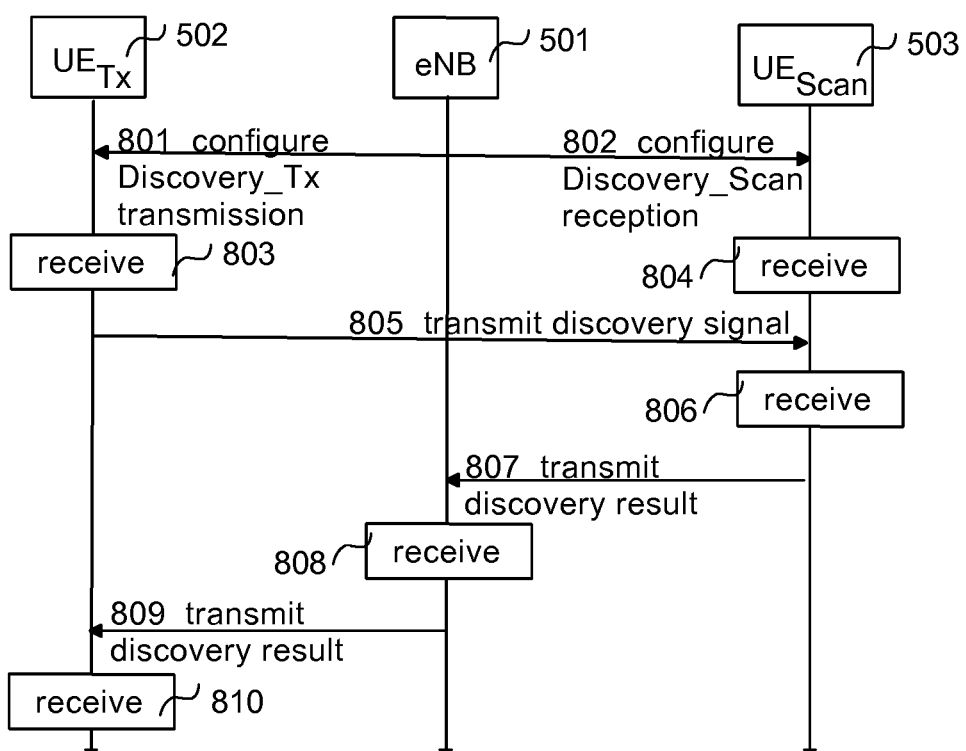
FIG. 8 shows a signalling diagram illustrating an exemplary messaging event according to an embodiment of the invention.

The signalling chart of FIG. 8 illustrates the required signalling in the example situation of FIG. 3. In the example of FIG. 8, a network node 501 (which may comprise e.g. a LTE-capable base station (eNode-B, eNB)) may transmit a configuration signal 801 to a first user terminal 502 ($UE_{Tx}$) supporting partial discovery PHY operation, for configuring $UE_{Tx}$ 502 to transmit a Discovery_Tx signal. This signalling 801 may be e.g. dedicated higher layer signalling. Before transmitting the signalling 801, eNB 501 may configure (not shown in FIG. 8) the resources available for discovery. The network apparatus 501 may transmit a configuration signal 802 to a second user terminal 503 ($UE_{Scan}$) supporting full discovery PHY operation, for configuring $UE_{Scan}$ 503 to perform a discovery scan on the resources configured for D2D discovery (i.e. to perform Discovery_Scan reception). In item 803, $UE_{Tx}$ 502 receives the configuration signal 801. In item 804, $UE_{Scan}$ 503 receives the configuration signal 802. In item 805, $UE_{Tx}$ 502 transmits a Discovery_Tx signal (on UL band/PHY) to $UE_{Scan}$ 503 in order the first user terminal 502 to be detected by the second user terminal 503. Transmission of the Discovery_Tx signal may be e.g. periodic transmission. In item 806, $UE_{Scan}$ 503 performs a Discovery_Scan operation (on UL band/PHY). The Discovery_Scan operation may be e.g. PDCCH blind decoding type of operation based on verification of CRC bits. Alternatively (if CRC bits do not exist) the Discovery_Scan operation may involve a DTX detection of the transmitted signal (or basically any energy detection). In item 807, $UE_{Scan}$ 503 with full discovery PHY functionality may report the result of the Discovery_Scan to the network apparatus eNB 501. In item 808, eNB 501 may receive the signalling 807. In item 808, eNB 501 may also store information on the D2D discovery process between $UE_{Tx}$ 502 and $UE_{Scan}$ 503. In item 809, eNB 501 may report the result of Discovery_Scan to $UE_{Tx}$ 502 that transmitted the Discovery_Tx signal 805. The signalling 807, 809 may be higher layer signalling (e.g. RRC or MAC signalling). Alternatively the signalling 807, 809 may be realized by PHY signalling or a combination of PHY and higher layer signalling. In item 810, $UE_{Tx}$ 502 may receive the signalling 809.

Figure 9:
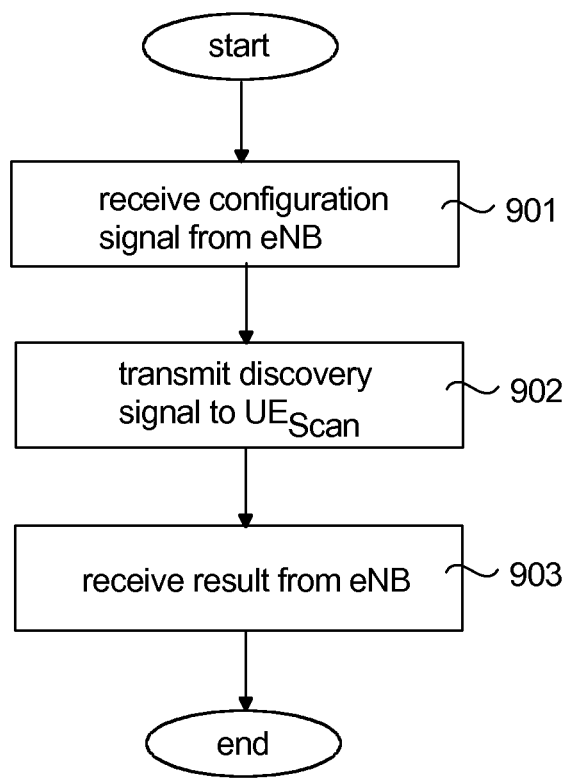
FIG. 9 shows a schematic diagram of a flow chart according to an exemplary embodiment of the invention.

FIG. 9 is a flow chart illustrating an exemplary embodiment. The apparatus 502, which may comprise e.g. a network element (network node, e.g. a user terminal, $UE_{Tx}$) receives, in item 901, from a network apparatus 501 (which may comprise e.g. a LTE base station eNB 501) a configuration signal for configuring $UE_{Tx}$ 502 to transmit a Discovery_Tx signal. The received configuration signalling may be e.g. dedicated higher layer signalling. In item 902, $UE_{Tx}$ 502 transmits a Discovery_Tx signal to $UE_{Scan}$ 503. Transmission 902 of the Discovery_Tx signal may be e.g. periodic transmission.

In FIG. 9, $UE_{Tx}$ may support full discovery PHY operation, and $UE_{Scan}$ may support partial discovery PHY operation, wherein the Discovery_Tx signal is transmitted 902 by using the downlink band. Alternatively, $UE_{Tx}$ may support partial discovery PHY operation, and $UE_{Scan}$ may support full discovery PHY operation, wherein the Discovery_Tx signal is transmitted 902 by using the uplink band. In the latter case, $UE_{Scan}$ 503 with full discovery PHY functionality may report the result of the Discovery_Scan to the network apparatus eNB 501, and eNB 501 may report the result of Discovery_Scan to $UE_{Tx}$ 502, wherein, in item 903, $UE_{Tx}$ 502 may receive the result of the Discovery_Scan from eNB 501 (e.g. via higher layer signalling).

Figure 10:
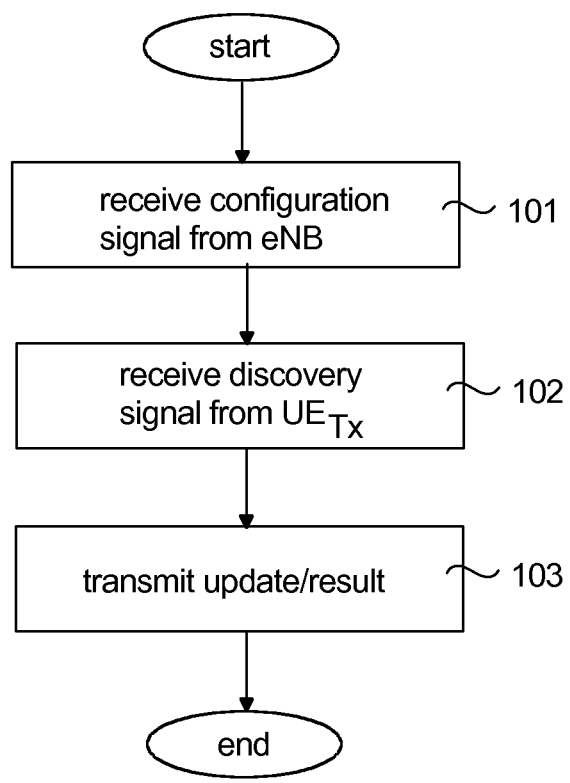
FIG. 10 shows a schematic diagram of a flow chart according to an exemplary embodiment of the invention.

FIG. 10 is a flow chart illustrating an exemplary embodiment. The apparatus 503, which may comprise e.g. a network element (network node, e.g. a user terminal, $UE_{Scan}$) receives, in item 101, from a network apparatus 501 (which may comprise e.g. a LTE base station eNB 501) a configuration signal for configuring $UE_{Scan}$ 503 to perform a discovery scan on the resources configured for D2D discovery (i.e. to perform Discovery_Scan reception). The received configuration signalling may be e.g. dedicated higher layer signalling. In item 102, $UE_{Scan}$ 503 receives a Discovery_Tx signal from $UE_{Tx}$ 502. Transmission 902 of the Discovery_Tx signal may be e.g. periodic transmission.

In FIG. 10, $UE_{Tx}$ may support full discovery PHY operation, and $UE_{Scan}$ may support partial discovery PHY operation, wherein the Discovery_Tx signal is received 102 by using the downlink band. $UE_{Scan}$ 503 with partial discovery PHY functionality may keep, in item 103, the network apparatus eNB 501 updated on the D2D discovery process between $UE_{Tx}$ 502 and $UE_{Scan}$ 503 ($UE_{Tx}$ 502 has full discovery PHY functionality). Alternatively, $UE_{Tx}$ may support partial discovery PHY operation, and $UE_{Scan}$ may support full discovery PHY operation, wherein the Discovery_Tx signal is received 102 by using the L1 uplink band. $UE_{Scan}$ 503 with full discovery PHY functionality may report, in item 103, the result of the Discovery_Scan to the network apparatus eNB 501, in order eNB 501 to report the result of Discovery_Scan to $UE_{Tx}$ 502 ($UE_{Tx}$ 502 has partial discovery PHY functionality).

Figure 11:
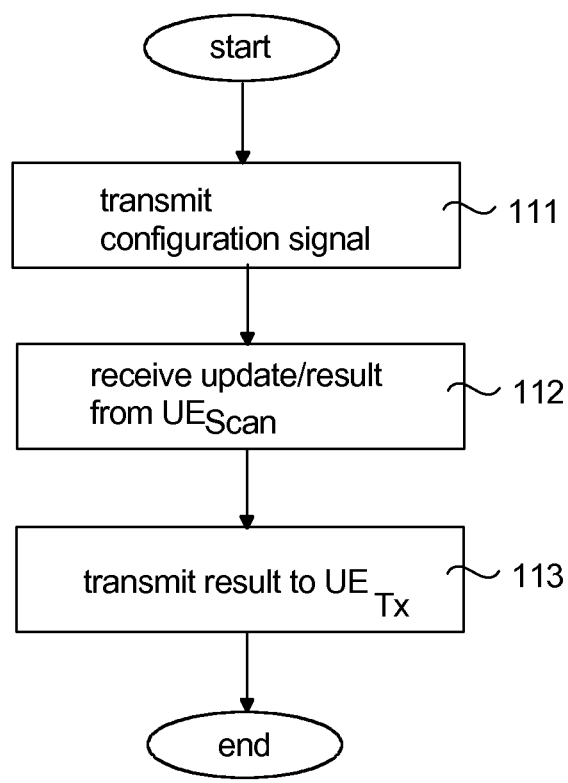
FIG. 11 shows a schematic diagram of a flow chart according to an exemplary embodiment of the invention.

FIG. 11 is a flow chart illustrating an exemplary embodiment. The apparatus 501, which may comprise e.g. a network element (network node, 501 (e.g. a LTE base station eNB 501) transmits, in item 111, to first network element (network node, e.g. a first user terminal, $UE_{Tx}$) a first configuration signal for configuring $UE_{Tx}$ 502 to transmit a Discovery_Tx signal, and to a second network element (network node, e.g. a second user terminal, $UE_{Scan}$) a second configuration signal for configuring $UE_{Scan}$ 503 to perform a discovery scan on the resources configured for D2D discovery (i.e. to perform Discovery_Scan reception). The transmitted 111 configuration signalling may be e.g. dedicated higher layer signalling.

In FIG. 11, $UE_{Tx}$ may support full discovery PHY operation, and $UE_{Scan}$ may support partial discovery PHY operation, wherein the D2D discovery signal is received/transmitted by using the downlink band. $UE_{Scan}$ 503 with partial discovery PHY functionality may keep the network apparatus eNB 501 updated on the D2D discovery process between $UE_{Tx}$ 502 and $UE_{Scan}$ 503 ($UE_{Tx}$ 502 has full discovery PHY functionality), wherein update information is received in eNB 501 from $UE_{Scan}$ 503 in item 112. Alternatively, $UE_{Tx}$ may support partial discovery PHY operation, and $UE_{Scan}$ may support full discovery PHY operation, wherein the wherein the D2D discovery signal is received/transmitted by using the L1 uplink band. $UE_{Scan}$ 503 with full the discovery PHY functionality may report the result of the Discovery_Scan to the network apparatus eNB 501, wherein the report is received in eNB 501 from $UE_{Scan}$ 503 in item 112. In item 113, eNB 501 reports the result of Discovery_Scan to $UE_{Tx}$ 502 ($UE_{Tx}$ 502 has partial discovery PHY functionality).

The steps/points, signalling messages and related functions described above in FIGS. 1 to 11 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for device-to-device discovery in a communications system, comprising transmitting, from a first user terminal a device-to-device discovery signal via a downlink band or resources in order for the first user terminal to be detected by a second user terminal when the device-to-device discovery signal is received via the downlink band or resources in the second user terminal, wherein the first user terminal is configured to support device-to-device discovery signal transmission via a downlink band or resources, and optionally device-to-device discovery signal reception via an uplink band or resources, wherein the second user terminal is configured to support device-to-device discovery signal reception via the downlink band or resources, and the second user terminal is incapable of supporting device-to-device discovery signal transmission.

According to another exemplary embodiment, there is provided a method for device-to-device discovery in a communications system, comprising transmitting, from a first user terminal, a device-to-device discovery signal via an uplink band or resources in order for the first user terminal to be detected by a second user terminal when the device-to-device discovery signal is received via the uplink band or resources in the second user terminal, wherein the first user terminal is configured to support device-to-device discovery signal transmission via an uplink band or resources, and the first user terminal is incapable of supporting device-to-device discovery signal reception, wherein the second user terminal is configured to support device-to-device discovery signal reception via the uplink band or resources, and optionally device-to-device discovery signal transmission via a downlink band or resources.

According to yet another exemplary embodiment, there is provided a method for device-to-device discovery in a communications system, comprising receiving, from a first user terminal in a second user terminal, a device-to-device discovery signal via a downlink band or resources in order for the first user terminal to be detected by the second user terminal, wherein the first user terminal is configured to support device-to-device discovery signal transmission via a downlink band or resources, and optionally device-to-device discovery signal reception via an uplink band or resources, wherein the second user terminal is configured to support device-to-device discovery signal reception via a downlink band or resources, and the second user terminal is incapable of supporting device-to-device discovery signal transmission.

According to yet another exemplary embodiment, there is provided a method for device-to-device discovery in a communications system, comprising receiving, from a first user terminal in a second user terminal, a device-to-device discovery signal via an uplink band or resources in order for the first user terminal to be detected by the second user terminal, wherein the first user terminal is configured to support device-to-device discovery signal transmission via an uplink band or resources, and the first user terminal is incapable of supporting device-to-device discovery signal reception, wherein the second user terminal is configured to support device-to-device discovery signal reception via the uplink band or resources, and optionally device-to-device discovery signal transmission via a downlink band or resources.

According to yet another exemplary embodiment, there is provided a terminal apparatus comprising at least one processor, and at least one memory including a computer program code, wherein the at least one memory and the computer program code are configured to, with the at least one processor, cause the terminal apparatus to transmit a device-to-device discovery signal via a downlink band or resources in order for the terminal apparatus to be detected by a further terminal apparatus when the device-to-device discovery signal is received via the downlink band or resources in the further terminal apparatus, wherein the terminal apparatus is configured to support device-to-device discovery signal transmission via a downlink band or resources, and optionally device-to-device discovery signal reception via an uplink band or resources, wherein the further terminal apparatus is configured to support device-to-device discovery signal reception via the downlink band or resources, and the further terminal apparatus incapable of supporting device-to-device discovery signal transmission.

According to yet another exemplary embodiment, there is provided a terminal apparatus comprising at least one processor, and at least one memory including a computer program code, wherein the at least one memory and the computer program code are configured to, with the at least one processor, cause the terminal apparatus to transmit a device-to-device discovery signal via a uplink band or resources in order for the terminal apparatus to be detected by a further terminal apparatus when the device-to-device discovery signal is received via the uplink band or resources in the further terminal apparatus, wherein the terminal apparatus is configured to support device-to-device discovery signal transmission via an uplink band or resources, and the terminal apparatus is incapable of supporting device-to-device discovery signal reception, wherein the further terminal apparatus is configured to support device-to-device discovery signal reception via the uplink band or resources, and optionally device-to-device discovery signal transmission via a downlink band or resources.

According to yet another exemplary embodiment, there is provided a terminal apparatus comprising at least one processor, and at least one memory including a computer program code, wherein the at least one memory and the computer program code are configured to, with the at least one processor, cause the terminal apparatus to receive, from a further terminal apparatus, a device-to-device discovery signal via a downlink band or resources in order for the further terminal apparatus to be detected by the terminal apparatus, wherein the further terminal apparatus is configured to support device-to-device discovery signal transmission via a downlink band or resources, and optionally device-to-device discovery signal reception via an uplink band or resources, wherein the terminal apparatus is configured to support device-to-device discovery signal reception via the downlink band or resources, and the terminal apparatus is incapable of supporting device-to-device discovery signal transmission.

According to yet another exemplary embodiment, there is provided a terminal apparatus comprising at least one processor, and at least one memory including a computer program code, wherein the at least one memory and the computer program code are configured to, with the at least one processor, cause the terminal apparatus to receive, from a further terminal apparatus, a device-to-device discovery signal via an uplink band or resources in order for the further terminal apparatus to be detected by the terminal apparatus when the device-to-device discovery signal is received via the uplink band or resources in the terminal apparatus, wherein the further terminal apparatus is configured to support device-to-device discovery signal transmission via an uplink band or resources, and the further terminal apparatus is incapable of supporting device-to-device discovery signal reception, wherein the terminal apparatus is configured to support device-to-device discovery signal reception via the uplink band or resources, and optionally device-to-device discovery signal transmission via a downlink band or resources.

According to yet another exemplary embodiment, the at least one memory and the computer program code are configured to, with the at least one processor, cause the terminal apparatus to receive, from a network apparatus, a configuration signal for configuring the terminal apparatus to transmit the device-to-device discovery signal.

According to yet another exemplary embodiment, the transmitting of the device-to-device discovery signal comprises periodic transmission.

According to yet another exemplary embodiment, the at least one memory and the computer program code are configured to, with the at least one processor, cause the terminal apparatus to receive, from a network apparatus, a configuration signal for configuring the terminal apparatus to search for and receive the device-to-device discovery signal.

According to yet another exemplary embodiment, the searching for and receiving of the device-to-device discovery signal comprises a blind decoding type operation or an energy detection operation for a pre-defined signal type.

According to yet another exemplary embodiment, the format of the discovery signal transmitted via the downlink band corresponds to an OFDM format.

According to yet another exemplary embodiment, the at least one memory and the computer program code are configured to, with the at least one processor, cause the terminal apparatus to transmit dedicated higher layer signalling to a network apparatus in order to keep the network apparatus updated on the device-to-device discovery process between the terminal apparatuses.

According to yet another exemplary embodiment, the at least one memory and the computer program code are configured to, with the at least one processor, cause the terminal apparatus to transmit a report on the result of searching for and receiving the device-to-device discovery signal to a network apparatus via higher layer signalling, via physical layer signalling, or via a combination of physical layer and higher layer signalling.

According to yet another exemplary embodiment, the at least one memory and the computer program code are configured to, with the at least one processor, cause the terminal apparatus to indicate its device-to-device discovery capability to the network apparatus via higher layer signalling.

According to yet another exemplary embodiment, the at least one memory and the computer program code are configured to, with the at least one processor, cause the terminal apparatus to support a frequency division duplex FDD mode.

According to yet another exemplary embodiment, there is provided a network apparatus comprising at least one processor, and at least one memory including a computer program code, wherein the at least one memory and the computer program code are configured to, with the at least one processor, cause the network apparatus to transmit a first device-to-device discovery configuration signal via layer-2 or higher layer signalling to a first terminal apparatus in order for the first terminal apparatus to be configured to support device-to-device discovery signal transmission via a downlink band or resources, and optionally device-to-device discovery signal reception via an uplink band or resources, transmit a second device-to-device discovery configuration signal via layer-2 or higher layer signalling to a second terminal apparatus in order for the second terminal apparatus to be configured to support device-to-device discovery signal reception via the downlink band or resources, and incapable of supporting device-to-device discovery signal transmission.

According to yet another exemplary embodiment, there is provided a network apparatus comprising at least one processor, and at least one memory including a computer program code, wherein the at least one memory and the computer program code are configured to, with the at least one processor, cause the network apparatus to transmit a first device-to-device discovery configuration signal via layer-2 or higher layer signalling to a first terminal apparatus in order for the first terminal apparatus to be configured to support device-to-device discovery signal transmission via an uplink band or resources, and incapable of supporting device-to-device discovery signal reception, transmit a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

According to yet another exemplary embodiment, the at least one memory and the computer program code are configured to, with the at least one processor, cause the network apparatus to receive, from the second terminal apparatus, via layer-2 or higher layer signalling, information on the result of a device-to-device discovery operation performed in the second terminal apparatus.

According to yet another exemplary embodiment, there is provided a method for device-to-device discovery in a communications system, comprising transmitting, from network apparatus, a first device-to-device discovery configuration signal via layer-2 or higher layer signalling to a first terminal apparatus in order for the first terminal apparatus to be configured to support device-to-device discovery signal transmission via a downlink band or resources, and optionally device-to-device discovery signal reception via an uplink band or resources; and transmitting, from network apparatus, a second device-to-device discovery configuration signal via layer-2 or higher layer signalling to a second terminal apparatus in order for the second terminal apparatus to be configured to support device-to-device discovery signal reception via the downlink band or resources, and incapable of supporting device-to-device discovery signal transmission.

According to yet another exemplary embodiment, there is provided a method for device-to-device discovery in a communications system, comprising transmitting, from network apparatus, a first device-to-device discovery configuration signal via layer-2 or higher layer signalling to a first terminal apparatus in order for the first terminal apparatus to be configured to support device-to-device discovery signal transmission via an uplink band or resources, and incapable of supporting device-to-device discovery signal reception, and transmitting, from network apparatus, a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

Although the various aspects, embodiments and features of the invention are recited independently, it should be appreciated that all combinations of the various aspects, embodiments and features of the invention are possible and within the scope of the present invention.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

AP access point
CQI channel quality indicator
CDMA code division multiple access
CSI channel state information
DCI downlink control information
D2D device-to-device
DL downlink
DTX discontinuous transmission
eNB eNode-B (base station)
ePDCCH enhanced physical downlink control channel
FEC forward error coding
IC interference cancellation
LTE long term evolution
MCS modulation and coding scheme
MIMO multiple input and multiple output
MU-MIMO multi-user MIMO
NSN Nokia Siemens Networks
PDCCH physical downlink control channel
PDSCH physical downlink shared channel
PHY physical layer (radio layer-1, L1)
PRB physical resource block
PSS physical synchronization signal
PUCCH physical uplink control channel
PUSCH physical uplink shared channel
QAM quadrature amplitude modulation
QPSK quadrature phase-shift keying
RRC radio resource control
RV redundancy version
SC-FDMA single-carrier frequency division multiple access
SINR signal to interference and noise ratio
SSS secondary synchronization signal
TB transport block
TBS transport block size
UE user equipment
UL uplink
FDD frequency division duplex
3GPP $3^{rd}$ generation partnership project
CRC cyclic redundancy check
MAC media access control
GSM global system for mobile communications
EDGE enhanced data rates for GSM evolution
WCDMA wideband code division multiple access
WLAN wireless local area network
OFDMA orthogonal frequency division multiple access
PRACH physical random access channel
TDD time division duplex

The invention claimed is:

1. A method for device-to-device discovery in a communications system, characterized by
    transmitting, from a first user terminal a device-to-device discovery signal via an uplink band or resources in order for the first user terminal to be detected by a second user terminal when the device-to-device discovery signal is received via the uplink band or resources in the second user terminal,
    wherein the first user terminal is configured to support device-to-device discovery signal transmission via an uplink band or resources, and the first user terminal is incapable of performing device-to-device discovery based on device-to-device discovery signal reception,
    wherein the second user terminal is configured to support device-to-device discovery signal reception via the uplink band or resources, and optionally device-to-device discovery signal transmission via a downlink band or resources.

2. A method for device-to-device discovery in a communications system, characterized by
    receiving, from a first user terminal in a second user terminal, a device-to-device discovery signal via an uplink band or resources in order for the first user terminal to be detected by the second user terminal,
    wherein the first user terminal is configured to support device-to-device discovery signal transmission via an uplink band or resources, and the first user terminal is incapable of performing device-to-device discovery based on device-to-device discovery signal reception, wherein the second user terminal is configured to support device-to-device discovery signal reception via the uplink band or resources, and optionally device-to-device discovery signal transmission via a downlink band or resources.

3. A terminal apparatus comprising at least one processor; and at least one memory including a computer program code, characterized in that the at least one memory and the computer program code are configured to, with the at least one processor, cause the terminal apparatus to transmit a device-to-device discovery signal via a uplink band or resources in order for the terminal apparatus to be detected by a further terminal apparatus when the device-to-device discovery signal is received via the uplink band or resources in the further terminal apparatus, wherein the terminal apparatus is configured to support device-to-device discovery signal transmission via an uplink band or resources, and the terminal apparatus is incapable of performing device-to-device discovery based on device-to-device discovery signal reception, wherein the further terminal apparatus is configured to support device-to-device discovery signal reception via the uplink band or resources, and optionally device-to-device discovery signal transmission via a downlink band or resources.

4. A terminal apparatus comprising at least one processor; and at least one memory including a computer program code, characterized in that the at least one memory and the computer program code are configured to, with the at least one processor, cause the terminal apparatus to receive, from a further terminal apparatus, a device-to-device discovery signal via an uplink band or resources in order for the further terminal apparatus to be detected by the terminal apparatus when the device-to-device discovery signal is received via the uplink band or resources in the terminal apparatus, wherein the further terminal apparatus is configured to support device-to-device discovery signal transmission via an uplink band or resources, and the further terminal apparatus is incapable of performing device-to-device discovery based on device-to-device discovery signal reception, wherein the terminal apparatus is configured to support device-to-device discovery signal reception via the uplink band or resources, and optionally device-to-device discovery signal transmission via a downlink band or resources.

5. A terminal apparatus as claimed in claim 3, characterized in that the at least one memory and the computer program code are configured to, with the at least one processor, cause the terminal apparatus to receive, from a network apparatus, a configuration signal for configuring the terminal apparatus to transmit the device-to-device discovery signal.

6. A terminal apparatus as claimed in claim 3, characterized in that the transmitting of the device-to-device discovery signal comprises periodic transmission.

7. A terminal apparatus as claimed in claim 4, characterized in that the at least one memory and the computer program code are configured to, with the at least one processor, cause the terminal apparatus to search for the device-to-device discovery signal.

8. A terminal apparatus as claimed in claim 7, characterized in that the at least one memory and the computer program code are configured to, with the at least one processor, cause the terminal apparatus to receive, from a network apparatus, a configuration signal for configuring the terminal apparatus to search for and receive the device-to-device discovery signal.

9. A terminal apparatus as claimed in claim 4, characterized in that searching for and receiving of the device-to-device discovery signal comprises a blind decoding type operation or an energy detection operation for a pre-defined signal type.

10. A terminal apparatus as claimed in claim 3, characterized in that the at least one memory and the computer program code are configured to, with the at least one processor, cause the terminal apparatus to transmit a report on the result of searching for and receiving the device-to-device discovery signal to a network apparatus via higher layer signalling, via physical layer signalling, or via a combination of physical layer and higher layer signalling.

11. A terminal apparatus as claimed in claim 3, characterized in that the at least one memory and the computer program code are configured to, with the at least one processor, cause the terminal apparatus to indicate its device-to-device discovery capability to the network apparatus via higher layer signalling.

12. A terminal apparatus as claimed in claim 3, characterized in that the at least one memory and the computer program code are configured to, with the at least one processor, cause the terminal apparatus to support a frequency division duplex FDD mode.

13. A network apparatus comprising at least one processor; and at least one memory including a computer program code, characterized in that the at least one memory and the computer program code are configured to, with the at least one processor, cause the network apparatus to transmit a first device-to-device discovery configuration signal via layer-2 or higher layer signalling to a first terminal apparatus in order for the first terminal apparatus to be configured to support device-to-device discovery signal transmission via an uplink band or resources, and incapable of performing device-to-device discovery based on device-to-device discovery signal reception; and, transmit a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

14. A network apparatus as claimed in claim 13, characterized in that the at least one memory and the computer program code are configured to, with the at least one processor, cause the network apparatus to receive, from the second terminal apparatus, via layer-2 or higher layer signalling, information on the result of a device-to-device discovery operation performed in the second terminal apparatus.

15. A method for device-to-device discovery in a communications system, characterized by transmitting, from network apparatus, a first device-to-device discovery configuration signal via layer-2 or higher layer signalling to a first terminal apparatus in order for the first terminal apparatus to be configured to support device-to-device discovery signal transmission via an uplink band or resources, and incapable of performing device-to-device discovery based on device-to-device discovery signal reception; and transmitting, from network apparatus, a second device-to-device discovery configuration signal via layer-2 or higher layer signalling to a second terminal apparatus in order for the second terminal apparatus to be configured to support device-to-device discovery signal reception via the uplink band or resources, and optionally device-to-device discovery signal transmission via a downlink band or resources.

\* \* \* \* \*